(12) United States Patent
Benke et al.

(10) Patent No.: US 10,289,726 B2
(45) Date of Patent: May 14, 2019

(54) SELF-OPTIMIZING TABLE DISTRIBUTION WITH TRANSPARENT REPLICA CACHE

(71) Applicant: INTERNATIONAL BUSINESS MACHINES CORPORATION, Armonk, NY (US)

(72) Inventors: Oliver Benke, Boeblingen (DE); Jan Kunigk, Boeblingen (DE); Stefan Letz, Markranstaedt (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 723 days.

(21) Appl. No.: 14/945,724

(22) Filed: Nov. 19, 2015

(65) Prior Publication Data

US 2016/0147805 A1 May 26, 2016

(30) Foreign Application Priority Data

Nov. 20, 2014 (GB) .................... 1420602.3

(51) Int. Cl.
*G06F 17/30* (2006.01)
(52) U.S. Cl.
CPC .............. *G06F 17/30584* (2013.01)
(58) Field of Classification Search
CPC ................................. G06F 17/30584
See application file for complete search history.

(56) References Cited

U.S. PATENT DOCUMENTS

| 7,966,340 | B2 | 6/2011 | Friedman et al. |
| 8,538,954 | B2 | 9/2013 | George et al. |
| 2002/0099818 | A1* | 7/2002 | Russell ................. H04L 67/02 709/224 |
| 2007/0174292 | A1* | 7/2007 | Li ..................... G06F 17/30457 |
| 2009/0077011 | A1* | 3/2009 | Natarajan ......... G06F 17/30445 |
| 2011/0246550 | A1* | 10/2011 | Levari ............... G06F 17/30412 709/201 |

(Continued)

FOREIGN PATENT DOCUMENTS

CN 104111958 A 10/2014

OTHER PUBLICATIONS

Alvaro, Peter et al., "Towards Scalable Architectures for Clickstream Data Warehousing," Proceedings of the 5th International Conference on Databases in Networked Information Systems, Oct. 2007, pp. 154-177.

(Continued)

*Primary Examiner* — Jared M Bibbee
(74) *Attorney, Agent, or Firm* — William A. Kinnaman, Esq.; Blanche E. Schiller, Esq.; Heslin Rothenberg Farley & Mesiti P.C.

(57) ABSTRACT

Storing data in a distributed database management system. The distributed database management system includes a first set of database tables, wherein data of a logical database table is distributed among the first set of database tables according to a first distribution key. A second set of database tables is maintained using a second distribution key that is different from the first distribution key. Furthermore, at least one performance metric value for the stored query when executing a query is maintained, and the second distribution key is determined based on the at least one performance metric value.

20 Claims, 3 Drawing Sheets

(56) References Cited

U.S. PATENT DOCUMENTS

| | | | |
|---|---|---|---|
| 2012/0215779 A1* | 8/2012 | Lipstone | G06F 17/30035 |
| | | | 707/737 |
| 2013/0036106 A1* | 2/2013 | Lucas | G06F 17/30351 |
| | | | 707/703 |
| 2013/0290249 A1 | 10/2013 | Merriman et al. | |
| 2013/0332608 A1* | 12/2013 | Shiga | G06F 9/5088 |
| | | | 709/226 |
| 2014/0074774 A1 | 3/2014 | Ito et al. | |
| 2014/0109459 A1 | 4/2014 | Sammut et al. | |
| 2014/0214799 A1 | 7/2014 | Li et al. | |
| 2014/0279897 A1* | 9/2014 | Bourbonnais | G06F 17/30575 |
| | | | 707/634 |
| 2015/0074216 A1* | 3/2015 | Park | H04L 67/10 |
| | | | 709/208 |
| 2016/0034504 A1* | 2/2016 | Borah | G06F 17/30312 |
| | | | 707/812 |
| 2016/0224579 A1* | 8/2016 | Porobic | G06F 17/30094 |
| 2016/0253402 A1* | 9/2016 | Klots | G06F 17/30584 |
| | | | 707/634 |

OTHER PUBLICATIONS

Chang, Lei et al., "HAWQ: A Massively Parallel Processing SQL Engine in Hadoop," SIGMOD '14 Proceedings of the 2014 ACM SIGMOD International Conference on Management of Data, Jun. 18, 2014, pp. 1223-1234.

Singh, Malcolm et al., "Introduction to the IBM Netezza Warehouse Appliance," CASCON '11 Proceedings of the 2011 Conference of the Center for Advanced Studies on Collaborative Research, Nov. 7, 2011, pp. 385-386.

Search Report for GB1420602.3 dated May 7, 2015, pp. 1-3.

\* cited by examiner

SELF-OPTIMIZING TABLE DISTRIBUTION WITH TRANSPARENT REPLICA CACHE

PRIOR FOREIGN APPLICATION

This application claims priority from United Kingdom (GB) patent application number 1420602.3, filed Nov. 20, 2014, which is hereby incorporated herein by reference in its entirety.

BACKGROUND

One or more aspects of the invention relate generally to storing data in a distributed database.

Nowadays, distributed database appliances sometimes allow the processing of relational SQL queries with little tuning effort. One exception, however, is with distribution keys which define how data is distributed among computing nodes of distributed database appliances. Often times, distributed database appliances are basically a massively parallel processor system with a partitioned database, often with partitioned tables. For efficient processing of complex queries like joins, it is crucial that joined data from multiple tables are on the same computing nodes. In general, it is important to reach a data distribution without significant skew, to allow all units to work on the data simultaneously. The distribution key influences how the table data is distributed across nodes. Manually picking the ideal distribution key depends on table contents as well as on the queries to be processed. Picking the wrong distribution key can have a severe performance impact, making execution, e.g., 10× slower and more.

In today's computing centers, it is often the case that customers only use a fraction of the available disk space, since disk space is inexpensive. However, to reach good performance, a high number of spindles is required. Also typical is that distributed database appliances have lots of idle time over the day. So, despite peaks of high usage, there is unused capacity without impacting productive workload.

SUMMARY

Shortcomings of the prior art are overcome and additional advantages are provided through the provision of a method of storing data in a distributed database management system. The method includes, for instance, having a first set of database tables in the distributed database management system, wherein data is distributed among the first set of database tables according to a first distribution key; maintaining a second set of database tables using a second distribution key that is different from the first distribution key; based on executing a query, maintaining at least one performance metric value for the query; and determining the second distribution key based on the at least one performance metric value.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the invention will now be described, by way of example only, and with reference to the following drawings.

DETAILED DESCRIPTION

Figure 1:
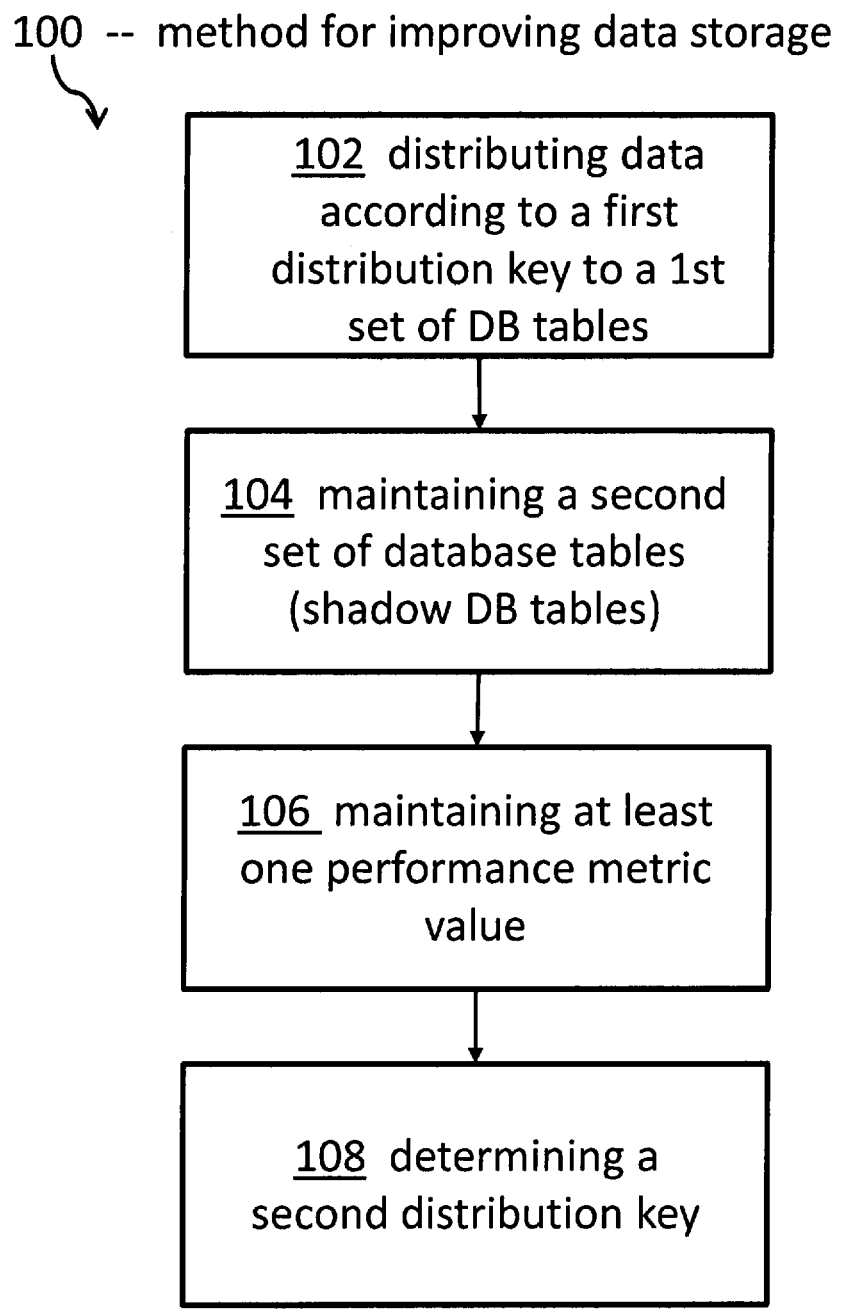
FIG. 1 shows a block diagram of an embodiment of the method, in accordance with an aspect of the present invention.

There are several disclosures related to a method for storing data in a distributed database. For instance, an optimization of the functionality of decomposition data skew in an asymmetric massively parallel processing database system has been disclosed. A table heading data skew is restructured by storing the original data of values in a special switch column added to the table, replacing the original data values of the distribution key with modified data values such as randomly generated data values, and partitioning the rows across the nodes of the asymmetric massively parallel processing database system based on the distribution key.

Further, systems and methods for managing a synchronous replication in a distributed database environment, while providing a scaling of the distributed database has been disclosed. In one embodiment, each cluster includes a node with a primary role to process write operations and manage asynchronous replication of the operation to at least one secondary node. Each cluster core set of nodes can host one or more partitions of database data.

In accordance with one or more aspects of the present invention, a capability for storing data in a distributed database is provided. Further, self-optimizing management of data distribution of database tables among computing nodes may be provided.

It may be noted that a first set of database tables may represent one logical database table in which distribution to partial database tables on different computing nodes is transparent to a client application. It may also be noted that a second set of database tables may be shadow database tables which may not be accessible directly by a client program.

In the context of this description, the following conventions, terms and/or expressions may be used:

The term "distributed database" may denote a database system based, e.g., on the relational database model. Other database models like a hierarchical database model or a NoSQL database model may also be possible. In a distributed database, different database tables may be distributed among storage systems, e.g., disks or the like, of different nodes of a multiprocessing system, massively parallel processing (MPP) system or, simply a cluster of computing nodes.

The term "database table" may denote a relation among data elements according to the relational database model. A database table may be partitioned meaning that different groups of records of the database may be managed separately. A partitioning of a database table may be done for different reasons according to the knowledge of a skilled person and according to different algorithms and different table splits.

The term "distribution key" may be used to define how records of a logical database table may be distributed to a set of physical database tables which may reside on storage systems of different nodes of the MPP system. Different distribution keys—e.g., a first distribution key, a second distribution key—may lead to a different partitioning of a logical database table.

The term "performance metric value" may denote a measured performance value according to a predefined performance metric definition. A typical performance metric may be the required time for executing a query.

The term "workload" may denote the kind of workload the database has to process, like a join on a set of tables, using a specific join attribute, or doing aggregate functions on a given table, with some group attributes, or different categories of database workloads.

The term "external query" may denote a query against the distributed database from a client system, e.g., a client application. An external query may be differentiated from an internal query originating from within the distributed database management system. Internal queries may be used to optimize the performance of the distributed database management system or simply database system.

One or more aspects of the method and the distribution manager system for storing data in a distributed database may offer the following:

Using second distribution keys and a second set of database tables—which may be treated as shadow database tables not accessible by a client program—may allow the comparing of performance metric values of queries against the original set of database tables, i.e., the first set of database tables, in comparison to the same queries against the second set of database tables. It may be noted that the database tables in question are, e.g., physically partial database tables belonging to one logical database table. Thus, the logical database table may be partitioned and distributed among different nodes of the distributed database management system.

By maintaining statistics, i.e., performance metric values on execution times for various queries for different distribution keys, an adaptation of the distribution key for a given workload of the distributed database management system is possible. This may be done without human intervention. For such a self-adaptation, idle times of the distributed database management systems may be used to try out different distributions for some previous queries. In doing so, the system may learn a better adapted distribution for a given set of data and a given workload over time. To do this in a discretionary way, such self-adaptation may be stopped immediately if real workloads from client systems may arrive.

In addition, the self-adaptation may be stopped immediately if the distributed database management system may run low on free storage. It may also be possible to drop some of the shadow tables. The system may start dropping those shadow tables which show relatively bad performance characteristics. Hence, free disk space may be used and after an iteration of different distribution keys the system may run at an optimal performance. Additionally, if workload characteristics change, that distributed database management system may also change its self-adaptation by using an adapted distribution key.

According to one embodiment, the at least one performance metric value may also comprise information about a workload at the time the query may be executed. This may ensure that different types of workloads may be reflected in a specific distribution key. For different workload types—e.g., analytics versus transactional—different distribution keys may be used.

According to a further embodiment, the at least one performance metric value may be selected out of the group comprising an execution time of the query and network traffic relating to the query. Other conformant metric values are also possible like, e.g., network fabric bottleneck measurement values. The network fabric may be responsible for managing traffic between cluster nodes.

According to an additional embodiment, the second distribution key may also be selected based on the workload. Thus, it may not only be selected based on the performance metric value but also on a workload profile for the distributed database management system. Thus, a better adapted determined experimental distribution key may be used for a partitioning of the data among the second set of database tables, i.e., the shadow database tables.

According to one embodiment, the second distribution key may be determined based on the at least one performance metric value and the workload over time. In this embodiment, a development of performance metric values and workload data over a period of time may influence a selection for a determination of a distribution key. The individual performance metric values for the different workloads may be averaged. However, also weighted average values according to predefined rules may be used. Thus, a distribution key may be adapted to a specific mix of workloads.

According to another embodiment, tasks relating to maintaining the second set of database tables may be stopped if an external query may be received by the distributed database. An external query may originate from a calling program or a client. Instead, an internal query may originate from the distributed database itself, as explained above. Hence, there is no performance degradation from a user perspective even if the self-adaptation mode of the database may be switched on meaning that alternative distribution keys together with shadow database tables may be tested.

According to one embodiment, one or more database tables of the second set of database tables may be dropped, e.g., released and/or deleted, if free storage for the distributed database management system, in particular on any of the supported nodes, falls under a predefined threshold value. Thus, the self-adaptation may not negatively influence the storage capacity of the distributed database management system. The self-adaptation process may run completely transparent to users and/or client programs.

According to a further embodiment, a third set of database tables may be maintained using a third distribution key. There could be a plurality of third, i.e., n sets of shadow database tables and third distribution keys for different workloads for an optimal distribution of data among the partitioned database tables for multiple kinds of workloads.

According to a different embodiment, in case the free storage for the distributed database system may fall under a predefined threshold value, those database tables of the second, third set or n-th of database tables relating to the worst performance metric value may be dropped. An optimizer functionality of the database system may be used for a determination of the worst set of shadow database tables. Thus, existing resources of the database system may be reused also for the described self-adaptation process.

This may also apply to the case in which n sets of shadows database tables may be used.

According to a specific embodiment, the determination of the second distribution key—and/or the third distribution key—may be performed based on at least one out of the group comprising a random algorithm, a hash algorithm, involved join operations with another database table, a primary key, and a secondary key. Basically, any method for generating a distribution key having at least a chance to generate a distribution key delivering a better performance of the database system may be used.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semiconductor system for a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention may be described with reference to different subject-matters. In particular, some embodiments may be described with reference to method type claims whereas other embodiments may be described with reference to apparatus type claims. However, a person skilled in the art will gather from the above and the following description that, unless otherwise notified, in addition to any combination of features belonging to one type of subject-matter, also any combination between features relating to different subject-matters, in particular, e.g., between features of the method type claims and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of a method for storing data in a distributed database management system, in accordance with one or more aspects of the present invention, is given.

FIG. 1 shows one example of a block diagram of an embodiment of the method for storing data in a distributed database management system. The distributed database management system comprises a first set of database tables. The stored data of a logical database table seen from a client, is distributed, 102, among the first set of database tables according to a first distribution key. The method also comprises maintaining, 104, a second set of database tables, i.e., shadow database tables, using a second distribution key for a distribution of the same data. The second distribution key is different from the first distribution key.

The method also comprises maintaining, 106, at least one performance metric value for queries. It may be used for performance comparisons using different distribution keys and an adaptation of the distribution key which may be transparent to a client program accessing the data.

Furthermore, the method may comprise determining, 108, a second distribution key based on the at least one performance metric value. Various algorithms may be used.

Figure 2:
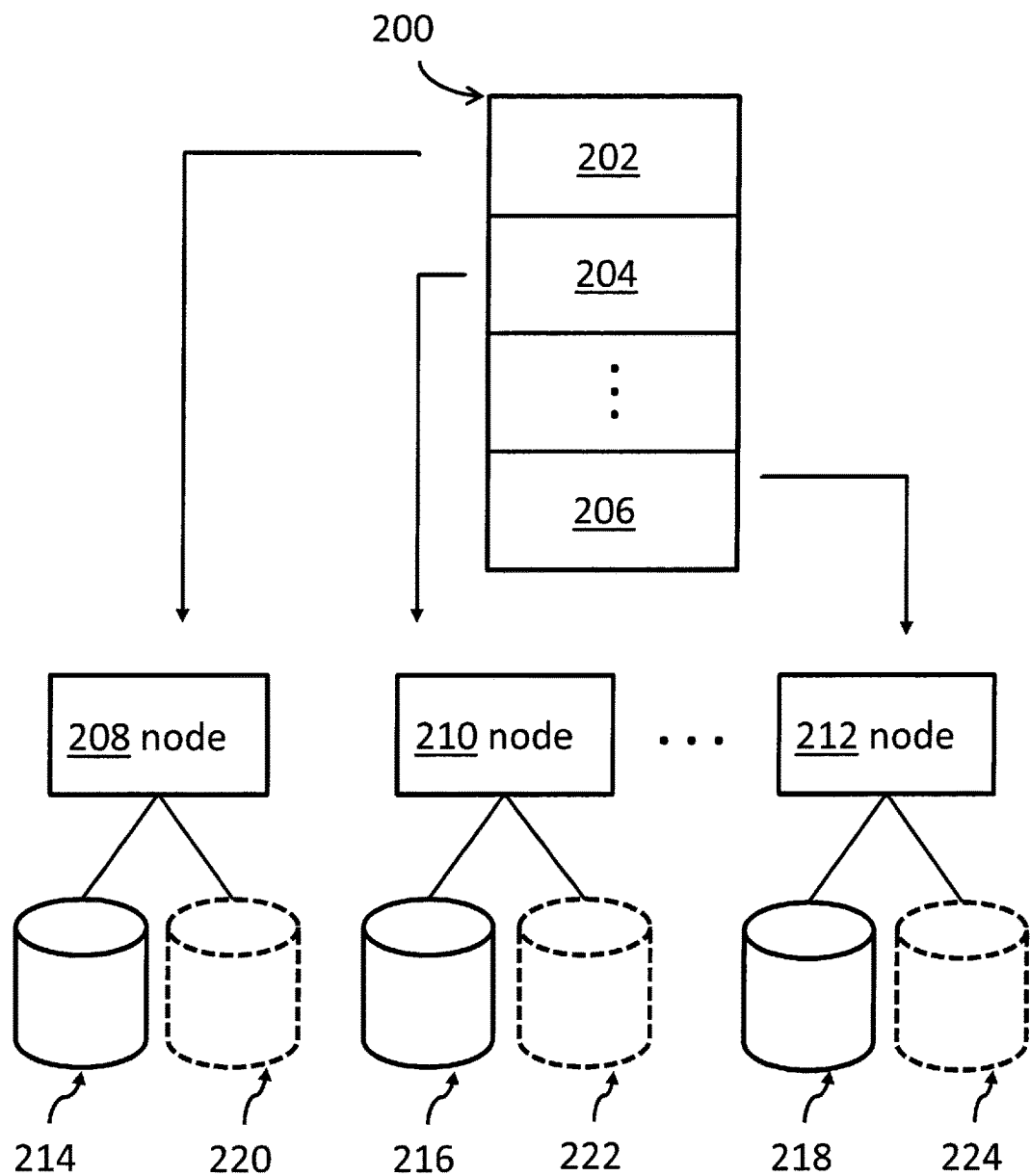
FIG. 2 shows one example of a block diagram of a distribution of data among a set of database tables, in accordance with an aspect of the present invention.

FIG. 2 shows one example of a block diagram of a distribution of data among a set of database tables. The logical database table 200 may be split into a plurality of logical partitions 202, 204 up to the n-th partition 206. For a client, like a client computer or a client program, the logical database table 200 appears as one logical construct. In reality, in a distributed database system based on an MPP system having a plurality of nodes 208, 210 up to the n-th node 212, the partitions 202, 204, . . . , 206 are managed and stored by the plurality of computing nodes 208, 210, . . . , 212. The partitions 202, 204, . . . , 206 may be stored on storage systems relating to the computing nodes 208, 210, . . . , 212. Hence, e.g., partition 202 may be stored as a partial database table 214 which may be managed by computing node 208, partition 204 may be stored as a partial database table 216 which may be managed by computing node 210, and so on, if a first distribution key is used. Thus, if a client program may access the logical database table 200, the data may be retrieved from the partitions stored as elements 214, 216, . . . , 218.

The dashed elements 220, 222, . . . , 224 may represent a second set of database tables 220, 222, . . . , 224 if compared to the first set of database tables 214, 216, . . . , 218. The second set of database tables 220, 222, . . . , 224 may also store partitions of the logical database table 200 but as shadow database tables. However, the split of individual records of the logical database table 200 and among the shadow database tables 220, 222, . . . , 224 may be different if compared to the first set of database tables 214, 216, . . . , 218.

Using a third distribution key, the split of records of the logical database table may be split among the managing computing nodes 208, 210, . . . , 212. More alternative distribution keys each with a set of shadow database tables are also possible.

Figure 3:
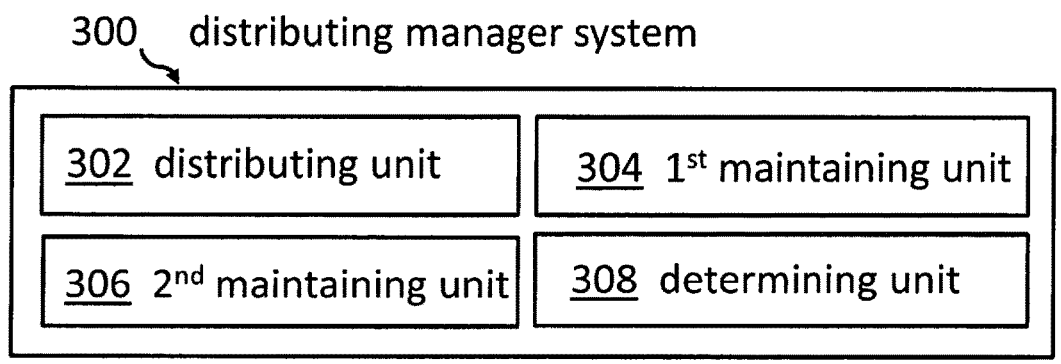
FIG. 3 shows one example of a block diagram of an embodiment of a distribution manager system, in accordance with an aspect of the present invention.

FIG. 3 shows one example of a block diagram of an embodiment of a distribution manager system 300 for storing data in a distributed database management system, in accordance with one or more aspects. The database management system may comprise a first set of database tables 214, 216, . . . , 218. The data, e.g., of a logical database table 200 is distributed using a distributing unit 302 among the first set of database tables 214, 216, . . . , 218 according to a first distribution key. The distribution manager system may also comprise a first maintaining unit 304 adapted for maintaining a second set of database tables—i.e., the shadow database tables—using a second distribution key that is different from the first distribution key. A second maintaining unit 306 may be adapted for maintaining at least one performance metric value for a query when executing the query. Thus, performance metric values may be stored and compared if different sets of database tables managed by the different nodes 208, 210, . . . , 212 are used.

A determining unit 308 may be adapted for determining the second distribution key based on the at least one performance metric value. Thus, a self-adaptation of the distributed database management systems may be achieved in the following way:

During idle times of the database management system, the database management system may recall queries that have been executed based on a past query from a client program. The database management system may execute that same query again, but this time against the shadow database tables 220, 222, . . . , 224. Results may not be returned to a client system. Also here, performance metric values may be determined.

Over time, a performance profile in time, in query type or depending on query complexity or depending on the logical tables 200 involved may be determined. A comparison of the performance profile of the first set of database tables 214, 216, . . . , 218 with the performance profile of the second set of database tables 220, 222, . . . , 224 for the same logical database table 200 may be determined.

This may be performed not only for one logical database table 200 but for a plurality or for all logical database tables 200 of the distributed database management system. If a comparison of the performance profile relating to the first set of database tables 214, 216, . . . , 218 distributed according to the first distribution key and the performance profile relating to the second set of database tables 220, 222, . . . , 224 distributed according to the second distribution key results in the fact that the performance relating to the second set of database tables 220, 222, . . . , 224 is higher, the second distribution key may be defined as a new first distribution key. This may result in a better partitioning—and thus better overall query performance—of each of the logical database tables 200 of the distributed database.

Alternatively, the complete set of second database tables 220, 222, . . . , 224 may be exchanged with the first set of database tables 214, 216, . . . , 218 and the system may distribute the logical database tables 200 according to the second distribution key which, consequently, becomes the first distribution key.

The respective distribution key may be the distribution basis for a split of all logical database tables 200 in the distributed database management system.

Hence, by experimenting with different distribution keys, the distributed database management system will be able to find a better and better distribution key over time by way of self-adaptation.

Figure 4:
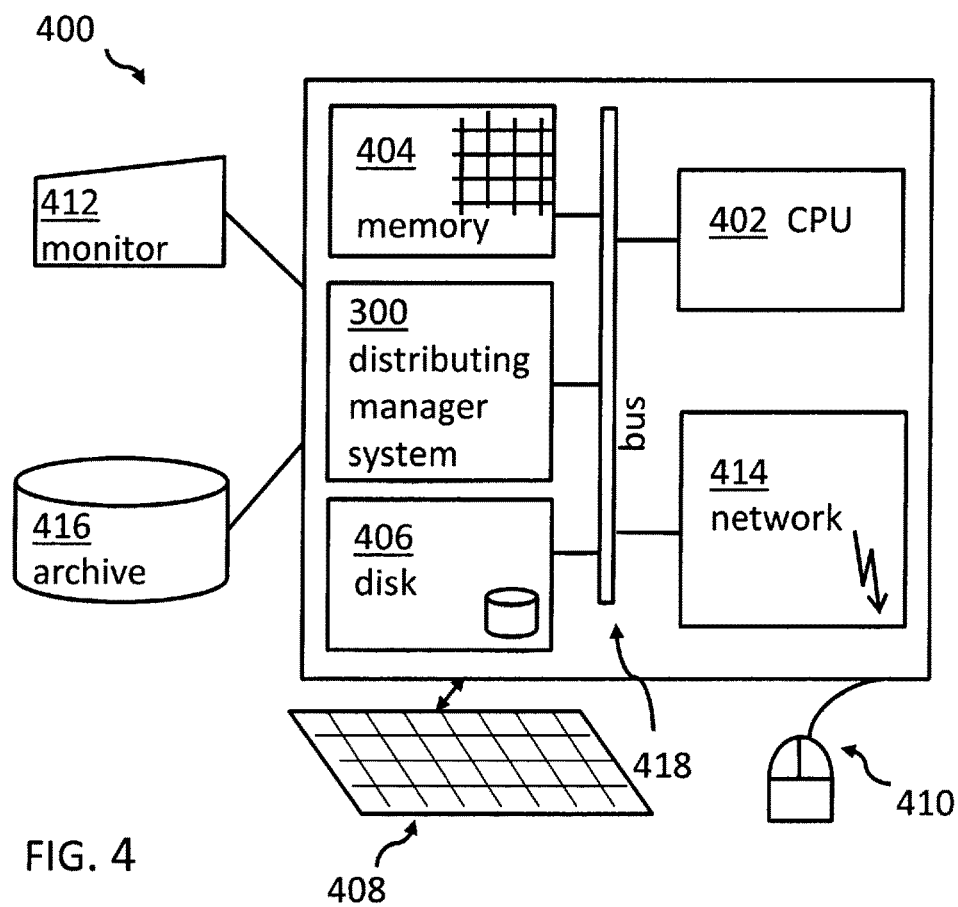
FIG. 4 shows an embodiment of a node of a massively parallel processing (MPP) system, in accordance with an aspect of the present invention.

Embodiments of the invention may be implemented together with virtually any type of computer, regardless of the platform being suitable for storing and/or executing program code. For example, as shown in FIG. 4, a computing system 400, representing a computing node 208, 210, . . . , 212 of an MPP system, may include one or more processor(s) 402 with one or more cores per processor, associated memory elements 404, an internal storage device 406 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 404 may include a main memory, e.g., a random access memory (RAM), employed during actual execution of the program code, and a cache memory, which may provide temporary storage of at least some program code and/or data in order to reduce the number of times code and/or data is to be retrieved from a long-term storage medium or external bulk storage 416 for an execution.

The internal storage device 406 and/or the external bulk storage 416 may be used to store the first set of database tables, i.e., the partitions 214, 216, . . . , 218 and/or the second set of database tables, i.e., the shadow database tables 220, 222, . . . 224.

Elements inside a node 208, 210, . . . , 212 of a parallel multi-processor computer may be linked together by means of a bus system 418 with corresponding adapters. Additionally, the distribution manager 300 may be attached to one of the nodes 208, 210, . . . , 212 or it may be available on every node 208, 210, . . . , 212 or its functionality may be distributed among the nodes 208, 210, . . . , 212. The different nodes 208, 210, . . . , 212 of the MPP system may be linked together using a network fabric (not shown).

Each computing system or node 400 or, in a more typical configuration, at least one of the nodes 208, 210, . . . , 212 may also include input means such as a keyboard 408, a pointing device such as a mouse 410, or a microphone (not shown). Alternatively, the computing system may be equipped with a touch sensitive screen as a main input device. Furthermore, the computer 400, may include output means such as a monitor or screen 412 (e.g., a liquid crystal display (LCD), a plasma display, a light emitting diode display (LED), or cathode ray tube (CRT) monitor). The computer system 400 may be connected to a network (e.g., a local area network (LAN), a wide area network (WAN)), such as the Internet or any other similar type of network, including wireless networks via a network interface connection 414. This may allow a coupling to other computer systems, or a storage network, or a tape drive. Those skilled in the art will appreciate that many different types of computer systems exist, and the aforementioned input and output means may take other forms. Generally speaking, the computer system 400 may include at least the minimal processing, input and/or output means, necessary to practice embodiments of the invention.

While aspects of the invention have been described with respect to a limited number of embodiments, those skilled in the art, having benefit of this disclosure, will appreciate that other embodiments may be devised, which do not depart from the scope of aspects of the invention, as disclosed herein. Accordingly, the scope of aspects of the invention should be limited only by the claims. Also, elements described in association with different embodiments may be combined. It should also be noted that reference signs in the claims, if any, should not be construed as limiting elements.

As described herein, according to one aspect, a method for storing data in a distributed database may be provided. The distributed database may comprise a first set of database tables, wherein data is distributed among the first set of database tables according to a first distribution key. The method may further comprise maintaining a second set of database tables, wherein the data is distributed among the second set of database tables according to a second distribution key that is different from the first distribution key.

The method may also comprise maintaining at least one performance metric value for a query when executing the query and determining the second distribution key based on the at least one performance metric value.

According to another aspect, a distribution manager system for storing data in a distributed database system may be provided. The database system may comprise a first set of database tables. Data may be distributed among the first set of database tables according to a first distribution key. The distribution manager system may also comprise a first maintaining unit adapted for maintaining a second set of database tables, wherein the data is distributed among the second set of database tables according to a second distribution key that is different from the first distribution key.

Furthermore, the distribution manager system may comprise a second maintaining unit adapted for maintaining at least one performance metric value for a query when executing the query and a determining unit adapted for determining the second distribution key based on the at least one performance metric value.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit aspects of the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims, if any, are intended to include any structure, material, or act for performing the function in combination with other claimed elements, as specifically claimed. The description of aspects of the present invention has been presented for purposes of illustration and description, but is not intended to be exhaustive or limited to aspects of the invention in the form disclosed. Many modifications and variations will be apparent to those of ordinary skills in the art without departing from the scope and spirit of aspects of the invention. The embodiment was chosen and described in order to best explain the principles of aspects of the invention and the practical application, and to enable others of ordinary skills in the art to understand aspects of the invention for various embodiments with various modifications, as are suited to the particular use contemplated.

What is claimed is:

1. A method of storing data in a distributed database management system, the method comprising:
   having a first set of database tables in the distributed database management system, wherein data is distributed among the first set of database tables according to a first distribution key;
   maintaining a second set of database tables using a second distribution key that is different from the first distribution key;
   based on executing a query, maintaining at least one performance metric value for the query;
   determining the second distribution key based on the at least one performance metric value;
   comparing performance metrics of at least one query performed against the first set of database tables and the second set of database tables; and
   performing self-adaptation of the database management system, based on the comparing, wherein there is an adaptation of a distribution key for a given workload to provide a different distribution of the data to improve performance of the database management system.

2. The method according to claim 1, wherein the at least one performance metric value comprises information about a workload at a time the query is executed.

3. The method according to claim 2, wherein the second distribution key is determined based on the at least one performance metric value and the workload over time.

4. The method according to claim 1, wherein the at least one performance metric value is selected out of a group comprising at least one of an execution time of the query or network traffic relating to the query.

5. The method according to claim 1, wherein the second distribution key is further selected based on workload data.

6. The method according to claim 1, wherein tasks relating to maintaining the second set of database tables are stopped based on receiving an external query by the distributed database management system.

7. The method according to claim 1, wherein one or more database tables of the second set of database tables is dropped based on free storage for the distributed database management system falling under a predefined threshold value.

8. The method according to claim 1, wherein a third set of database tables is maintained using a third distribution key.

9. The method according to claim 8, wherein, based on free storage falling under a predefined threshold value, database tables of the third set of database tables relating to a worst performance metric value are dropped.

10. The method according to claim 1, wherein the determination of the second distribution key is performed based on at least one of a random algorithm, a hash algorithm, involved join operations with another database table, a primary key, or a secondary key.

11. A computer program product for storing data in a distributed database management system, the computer program product comprising:
   a computer readable storage medium readable by a processing circuit and storing instructions for execution by the processing circuit for performing a method comprising:
      having a first set of database tables in the distributed database management system, wherein data is distributed among the first set of database tables according to a first distribution key;
      maintaining a second set of database tables using a second distribution key that is different from the first distribution key;
      based on executing a query, maintaining at least one performance metric value for the query;
      determining the second distribution key based on the at least one performance metric value;
      comparing performance metrics of at least one query performed against the first set of database tables and the second set of database tables; and
      performing self-adaptation of the database management system, based on the comparing, wherein there is an adaptation of a distribution key for a given workload to provide a different distribution of the data to improve performance of the database management system.

12. The computer program product according to claim 11, wherein the at least one performance metric value comprises information about a workload at a time the query is executed.

13. The computer program product according to claim 11, wherein the at least one performance metric value is selected out of a group comprising at least one of an execution time of the query or network traffic relating to the query.

14. The computer program product according to claim 11, wherein tasks relating to maintaining the second set of database tables are stopped based on receiving an external query by the distributed database management system.

15. The computer program product according to claim 11, wherein one or more database tables of the second set of database tables is dropped based on free storage for the distributed database management system falling under a predefined threshold value.

16. A computer system for storing data in a distributed database management system, the computer system comprising:
   a memory; and
   a processor in communication with the memory, wherein the computer system is configured to perform a method, said method comprising:
      having a first set of database tables in the distributed database management system, wherein data is distributed among the first set of database tables according to a first distribution key;
      maintaining a second set of database tables using a second distribution key that is different from the first distribution key;
      based on executing a query, maintaining at least one performance metric value for the query;
      determining the second distribution key based on the at least one performance metric value
      comparing performance metrics of at least one query performed against the first set of database tables and the second set of database tables; and
      performing self-adaptation of the database management system, based on the comparing, wherein there is an adaptation of a distribution key for a given workload to provide a different distribution of the data to improve performance of the database management system.

17. The computer system according to claim 16, wherein the at least one performance metric value comprises information about a workload at a time the query is executed.

18. The computer system according to claim 16, wherein the at least one performance metric value is selected out of a group comprising at least one of an execution time of the query or network traffic relating to the query.

19. The computer system according to claim 16, wherein tasks relating to maintaining the second set of database tables are stopped based on receiving an external query by the distributed database management system.

20. The computer system according to claim 16, wherein one or more database tables of the second set of database tables is dropped based on free storage for the distributed database management system falling under a predefined threshold value.

* * * * *